J. J. McGUIRE.
DUST PROOF SELF OILER FOR AXLES.
APPLICATION FILED MAR. 31, 1909.

950,298.

Patented Feb. 22, 1910.

WITNESSES
Geo. W. Naylor
F. D. Ammen

INVENTOR
John J. McGuire
BY Munn & Co
ATTORNEYS

UNITED STATES PATENT OFFICE.

JOHN J. McGUIRE, OF NEW YORK, N. Y.

DUST-PROOF SELF-OILER FOR AXLES.

950,298.

Specification of Letters Patent. Patented Feb. 22, 1910.

Application filed March 31, 1909. Serial No. 486,859.

*To all whom it may concern:*

Be it known that I, JOHN J. McGUIRE, a citizen of the United States, and a resident of the city of New York, borough of Manhattan, in the county and State of New York, have invented a new and Improved Dust-Proof Self-Oiler for Axles, of which the following is a full, clear, and exact description.

This invention relates to wheels such as carried by carts and wagons.

The object of the invention is to produce a wheel having an axle box which will be self-oiling and substantially dust-proof.

The invention consists in the construction and combination of parts to be more fully described hereinafter and particularly set forth in the claim.

Reference is to be had to the accompanying drawings forming a part of this specification, in which similar characters of reference indicate corresponding parts in all the figures.

Figure 1:
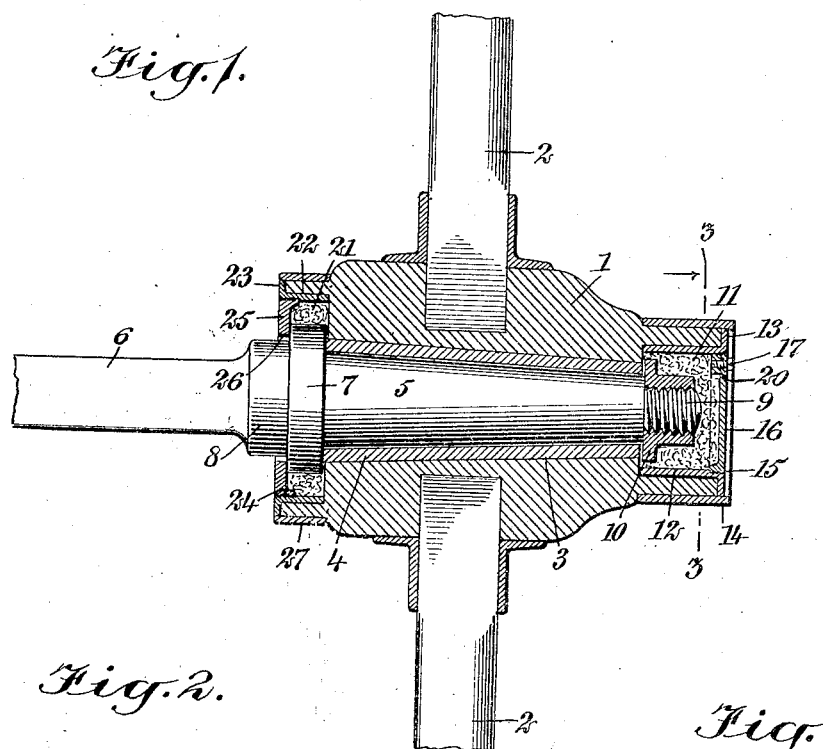
Figure 2:
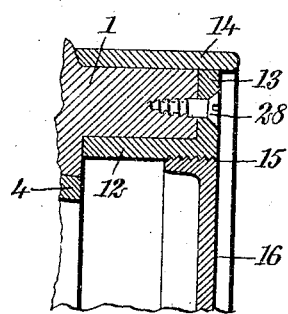
Figure 3:
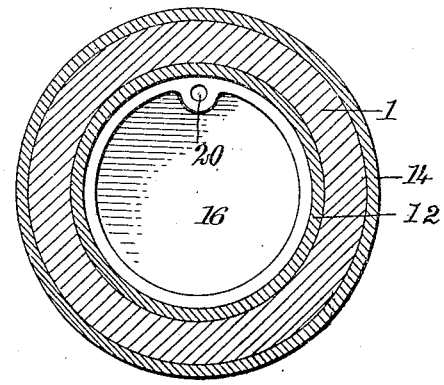

Figure 1 is a vertical section taken through a wheel constructed according to my invention; Fig. 2 is a vertical section taken at the outer portion of the wheel and showing on a large scale certain details of its construction; and Fig. 3 is a vertical cross section taken on the line 3—3 of Fig. 1.

Referring more particularly to the parts, 1 represents the hub of the wheel in which the spokes 2 are mounted, as shown. This hub is provided with a tapering bore 3 in which there is received a tapered box 4, which box seats upon the tapered arm or spindle 5 of the axle 6. At the inner end of the spindle 5, a removable collar 7 is provided, which collar seats against the side of an upset shoulder 8 on the axle. The end of the spindle is turned down to form a threaded stud 9, upon which is received a hub nut 10 which holds the hub in position, as shown. The nut 10 is completely inclosed in the outer end of the hub. For this purpose, this portion of the hub is formed into a circular oil chamber, in which a quantity of absorbent material 11, such as cotton waste or similar material, is received. The oil chamber is provided with a liner 12 which has a cylindrical body fitting nicely within the chamber, as shown. The outer part of this liner is formed with a projecting flange 13, which seats on the outer end of the hub, as shown. The outer portion of the hub at this point is provided with the usual hub ring 14, as indicated. The liner 12 is provided with screw threads 15 so as to receive a removable cap 16. This cap 16 is provided with a removable machine screw 17, which is mounted in the oil hole 20. When the machine screw 17 is removed, the oil will be introduced into the interior of the oil cup or oil chamber, and this oil is absorbed by the waste 11. This oil finds its way to the surface of the spindle and works back toward the collar 7 on account of the downward inclination or taper of the lower side of the spindle. As the box is constantly rotated, this oil will be carried up on the upper side of the spindle toward the inner end, and then works back toward the outer end of the spindle on the upper side.

The inner end of the hub is bored out so as to form a dust chamber at the collar 7, and in this dust chamber a quantity of absorbent material 21 is placed. This material is preferably formed of lamp wick or similar woven material, which is wrapped around the lateral surface, that is, the cylindrical face of the collar in the annular space formed about the same. This dust chamber is provided with a liner 22, the body of which is in the form of a ring, as indicated. The outer portion of the liner 22 is formed with an outwardly projecting flange 23, which seats against the inner face of the hub, as shown. The liner 22 is provided at its outer extremity with screw threads 24 which enable it to receive removably an annular ring or keeper 25. This ring 25 has an opening 26, which is sufficiently large to permit the ring to be rotated on the upset shoulder 8, which shoulder is usually of square form. In order to reinforce the hub at this point, a hub ring 27 is mounted thereupon, as shown.

Referring now to Fig. 2, attention is called to the manner of securing the liner 12 in position. This is accomplished by means of small wood screws 28 which are passed through the flange 13 and fasten in the end face of the hub, as indicated.

With a hub constructed as described, a quantity of oil carried in the oil cup or reservoir will be fed gradually to the box so as to keep it well lubricated. It will be evident that the dust will be effectually excluded not only from the outer side of the hub, but also from the inner side, as the pressure of the keeper 25 on the packing 21 will force this packing outwardly against the ring 7 so as to prevent any dust working inwardly at this point. The cap 16 and the keeper 25 may be removed or replaced by means of a spanner wrench.

Having thus described my invention, I claim as new and desire to secure by Letters Patent,—

The combination of an axle, a dust collar and a spindle mounted thereupon, said spindle extending beyond said dust collar, a hub revolubly mounted upon said spindle, said hub having an oil chamber formed in its outer end, a liner for said oil chamber, said liner having a cylindrical body disposed within said oil chamber, and also having a flange engaging the outer end of said hub, means for securing said flange to said hub in order to hold said liner in position, a cap having a threaded connection with said liner forming a closure for said oil chamber, a nut within said oil chamber retaining said hub, a dust chamber formed at the inner end of said hub at said collar, a liner received in said dust chamber, a packing material disposed about said collar in said dust chamber, and a keeper having a threaded engagement with said last-named liner and retaining said packing, said keeper being adapted to abut the face of said collar remote from said hub.

In testimony whereof I have signed my name to this specification in the presence of two subscribing witnesses.

JOHN J. McGUIRE.

Witnesses:
F. D. AMMEN,
JOHN P. DAVIS.